H. C. ALGER.
LIQUID METER.
APPLICATION FILED AUG. 8, 1912.

1,126,933.

Patented Feb. 2, 1915.
2 SHEETS—SHEET 1.

WITNESSES
James G. Hunt.
C. L. Higley.

INVENTOR
Harley C. Alger

H. C. ALGER.
LIQUID METER.
APPLICATION FILED AUG. 8, 1912.

1,126,933.

Patented Feb. 2, 1915.
2 SHEETS—SHEET 2.

WITNESSES
James J. Hunt.
C. L. Higley

INVENTOR
Harley C. Alger

UNITED STATES PATENT OFFICE.

HARLEY C. ALGER, OF CHICAGO HEIGHTS, ILLINOIS.

LIQUID-METER.

1,126,933.  Specification of Letters Patent.  Patented Feb. 2, 1915.

Application filed August 2, 1912. Serial No. 712,117.

*To all whom it may concern:*

Be it known that I, HARLEY C. ALGER, a citizen of the United States, residing at Chicago Heights, in the county of Cook and State of Illinois, have invented new and useful Improvements in Liquid-Meters, of which the following is a specification.

My invention relates to improvements in liquid meters in which measuring chambers or measuring compartments are automatically filled and emptied, one object being to provide a meter which shall receive liquid in either a continuous or varying stream as required and deliver it in unit charges of definite weight or volume without stopping or otherwise interfering with the rate of flow in the supply line to the meter.

Another object is the construction of an apparatus of this character so that its measuring compartments can not be filled beyond a certain pre-determined level while a still further object is to make the operation of its mechanism so positive that it will operate under severe and varying conditions.

These objects I attain by certain constructions and arrangements of parts as hereinafter described.

Figure 3:
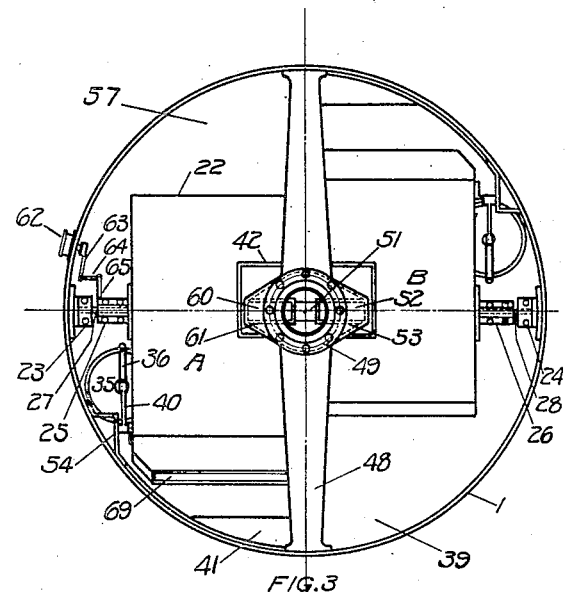
Figure 1:
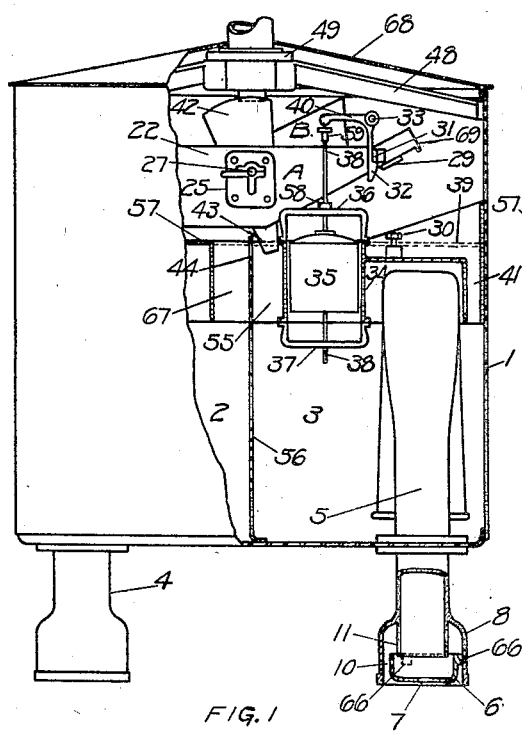
Figure 2:
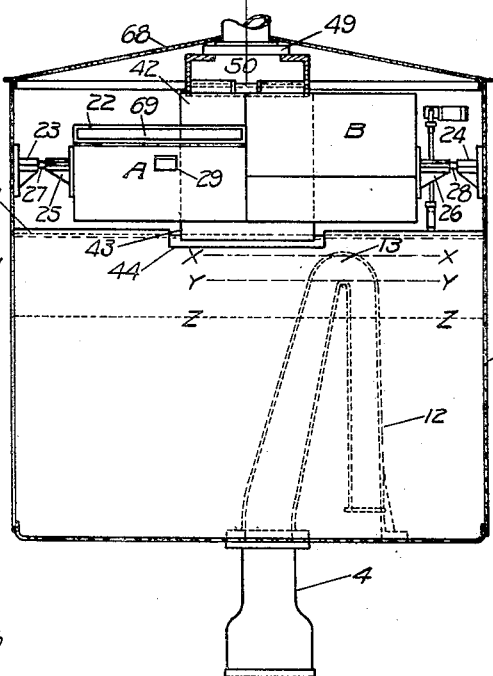
Figure 9:
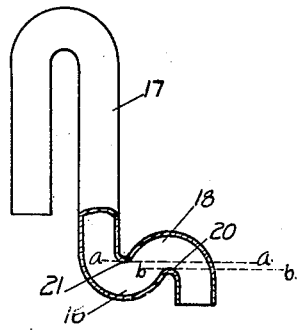
Figure 5:
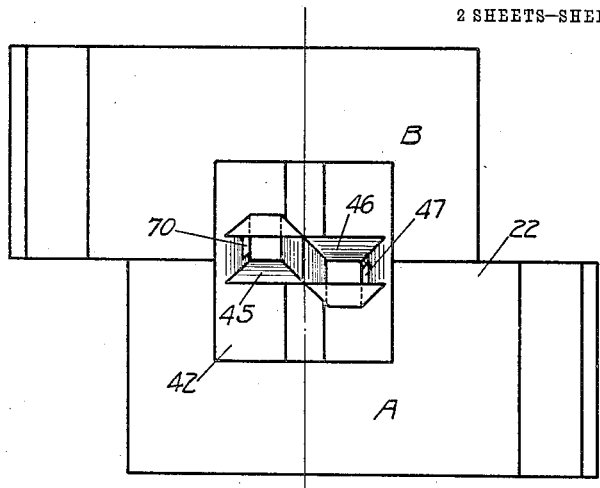
Figure 4:
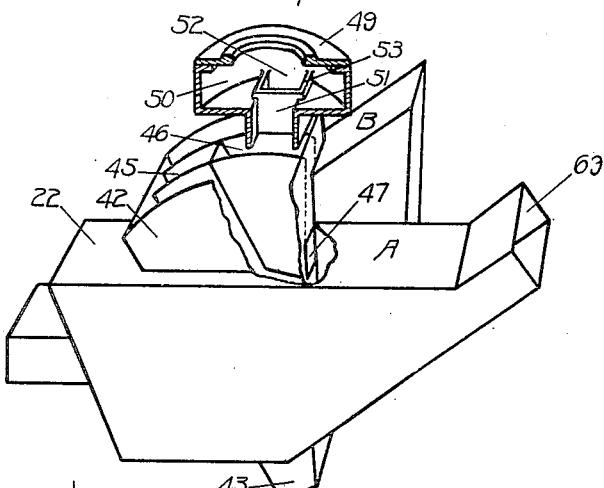
Figure 7:
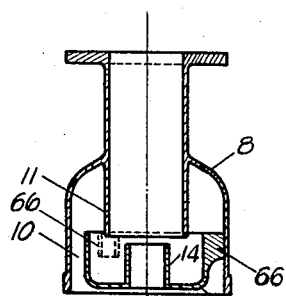
Figure 6:
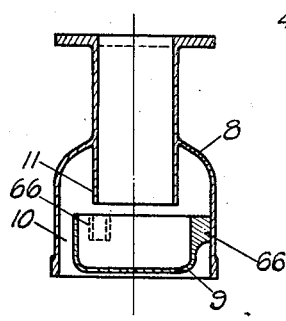

In the accompanying drawings, Figure 1 is a vertical view of a meter, partly in section; Fig. 2 is a vertical sectional view at right angles to Fig. 1; Fig. 3 is a plan view of Fig. 2 with cover removed; Fig. 4 is a perspective view of the tipping member with receiving chamber; Fig. 5 is a plan view of the tipping member; Fig. 6, Fig. 7, Fig. 8 and Fig. 9 show modifications which may be used in the construction of the discharge pipes.

The meter comprises a shell, 1, made of any suitable material and preferably closed at its top by means of a cover, 68. The lower part of the shell is divided into two measuring compartments, 2 and 3, Fig. 1, by means of a partition, 56; siphon pipes, 4 and 5, may be adapted to siphon liquid from compartments, 2 and 3, respectively when each full unit charge has been received.

The siphons may be constructed in any approved manner, each having a bend as shown at 13, Fig. 2, preferably flattened to quicken its action, an intake leg, 12, extending to a point near the bottom of the measuring compartment and a longer discharge leg extending to a lower point below the measuring compartment. The discharge leg of each siphon pipe I preferably provide with a temporary liquid seal which may be constructed by any approved means such as shown at the discharge end, 11, of siphon pipe 5, Fig. 1, or as shown in the modifications in the construction of the discharge pipe in Figs. 6, 7, 8 and 9. The purpose of this liquid seal is to surround the discharge end of the siphon pipe temporarily with liquid, particularly at the instant the siphon starts to operate, in order to make the siphon catch in a solid stream and to prevent the admission of air to the discharge leg of the siphon which may tend to cause the siphon to break thus interfering with the proper operation of the device. I do not confine myself to any particular construction of this temporary liquid seal but have shown constructions in Figs. 1, 6, 7, 8, and 9 which may be employed.

A cup, 6, Fig. 1, may be placed at the discharge end, 11, of the siphon pipe, 5, so as to liquid seal the end of the pipe when the cup is full of liquid; an opening, 7, of suitable size, in the lower portion of the cup, drains the cup when liquid is not passing through the siphon pipe in sufficient volume to maintain the cup full of liquid, thus doing away with the liquid seal when no liquid is passing through the siphon at the time when the liquid seal is not wanted; a suitable shield, 8, may be provided surrounding the cup, 6, and discharge pipe end, 11, to redirect the liquid downward through the annular space, 10, and prevent liquid from splashing upward, although the use of such a shield is optional. The cup, 6, may be held in place by lugs, 66, bolted to the shield, 8, or any other desired method of supporting the cup in place may be employed.

Figure 8:
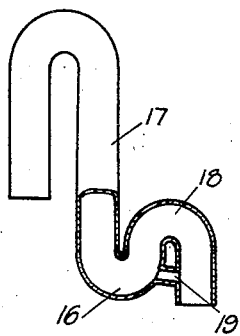

As liquid starts through the siphon pipe in sufficient quantity it first fills the cup, 6, which forms a liquid seal preventing air from being admitted to the discharge leg of the siphon pipe and any air which may have been retained in the siphon pipe and which might prevent the siphon from catching in a solid stream is gradually carried out with the liquid passing through the pipe. As no more air can gain admittance due to the liquid seal, the pipe soon becomes full of liquid and liquid runs in a solid stream. In this manner less liquid is needed to flush and start a siphon than if the discharge leg is not temporarily liquid sealed, the operation of the siphon is made more certain, and the whole device is consequently made more efficient and trustworthy. When the siphon is not operating it is desirable that its interior shall be in communication with the atmosphere so that the liquid will rise freely at the same level in the intake leg of the siphon as in the measuring compartment with which it communicates, so that it is desirable to have the discharge leg of the siphon liquid sealed only at the time the siphon is operating or about to start operating. Where the cup is of such size that it would require a considerable amount of liquid to fill it, the quantity necessary may be reduced by providing a tube, 14, Fig. 7, open at each end extending from the bottom of the cup, 15, to a level just below the edge of the cup and preferably below the end of the discharge pipe. This arrangement will retain liquid within the cup to the top level of the tube, 14, while the tube, 14, will provide an additional vent to the interior of the pipe when liquid is not flowing. The cup will then be nearly full of liquid when the siphon is not operating and less liquid will be required to liquid seal the discharge end, 11, of the siphon pipe. A somewhat similar object may be attained by using a cup, 9, Fig. 6, without an opening for draining the liquid therefrom by placing the cup, 9, in a suitable position so that its top edge is slightly below the discharge end, 11, of the siphon pipe. When liquid overflows the edge of the cup, 9, in sufficient quantity the level of the liquid will rise above the edge of the cup so as to seal the discharge end, 11; when liquid ceases to pass to the cup, the liquid level will fall to the edge of the cup thus leaving the interior of the siphon pipe in communication with the atmosphere. A temporary liquid seal may also be provided as shown in Fig. 8, by making a return bend, 16, in the discharge leg of the siphon pipe, 17, which will have the effect of liquid sealing the discharge leg. If desired, a second return bend, 18, may redirect the liquid downward similarly to the shield, 8, Fig. 1. An opening, 19, Fig. 8, may drain the return bend, 16. The bend may be used without the drain by providing a construction similar to that illustrated by Fig. 6, by making the lower part of the bend, 18, Fig. 9, at the point, 20, on the line b—b, a suitable distance below the upper part of the bend, 16, at the point, 21, on the line a—a. The interior of the siphon pipe will then be normally vented to the atmosphere but as liquid starts through the siphon and spills over the point, 20, it will rise sufficiently to seal the siphon pipe at the point, 21, which provides the temporary liquid seal desired.

Each measuring compartment is preferably closed at the top by a semi-circular head, measuring compartment, 2, being closed, by head, 57, and measuring compartment, 3, being closed by head, 39, as shown in Figs. 1 and 3. Head, 57, is shown dotted in Fig. 2. Each head is formed as shown more clearly with head, 39, Fig. 1, with a casing, 34, suitable for receiving a float, 35, also with a passage, 41, adapted to receive liquid from the tipping member and deliver it to the measuring compartment below, and also with a passage or opening, 55, which receives liquid from the chute, 42, at its lower end, 43, and delivers it to the measuring compartment below. The heads 39 and 57 are preferably of hollow construction with sides extending downward to a level below the bends in the siphon pipes as shown in Figs. 1 and 2. The level to which the heads 39 and 57 extend is shown by the dotted line Z—Z in Fig. 2. As the measuring compartment fills, liquid rises over the whole area of the compartment, but the head, 39, serves to displace liquid so that when the liquid reaches the level, Z—Z, at the bottom of the head it cannot rise over the whole area of the measuring compartment but only over the relatively small areas of the passage, 41, the opening, 55, the annular space formed between the casing, 34, and float, 35, and any small space which may surround the head, 39, where it meets the shell, 1, and partition, 56. This construction makes the device more nearly accurate, as any variations in the height which the water reaches take place over the relatively small areas instead of over the whole area of the measuring compartment. It is to be noted that the head, 39, may be open at its bottom if desired, for in this case it remains full of air which cannot escape as the liquid rises thus serving to displace liquid even if not closed at the bottom.

At the middle of the partition 56, I preferably cut down a portion of the partition over which the lower end, 43, of the chute, 42, swings to form a spill-over as shown at, 44, Fig. 2. The level of the spill-over is above the bottom line Z—Z, of the head, 39, slightly above the level of the top of the bends, X—X, in the siphon pipes and below the top of the heads. The height of the spill-over above the line, X—X, is such that sufficient head will be maintained above the bends to flush and start the siphons. The top of the heads should be at a higher level than the spill-over, 44, so that liquid will pass over the spill-over and not flood over the top of the heads. The spill-over is provided in this peculiar manner so that the measuring compartment which measures the unit charge cannot become filled beyond this level, for if it does the extra liquid will spill into the opposite compartment thus becoming a part of the next unit charge to be delivered.

A tipping member, 22, Figs. 1, 2, 3, 4 and 5, composed of two receptacles, A and B, which alternately fill with liquid, serves the double purpose of furnishing a sufficient quantity of liquid to flush and start the siphons and to shift the supply from one measuring compartment to the other. The two receptacles, A and B, which are similar, are placed side by side being turned end for end so that similar parts extend in opposite directions and the whole tipping member may be mounted on bearings, 23 and 24, of any approved design so that the tipping member can tilt back and forth. Brackets, 25 and 26, may be bolted to the side of the tipping member, shafts, 27 and 28, may be clamped tightly in the brackets, 25 and 26, and may extend into the bearings, 23 and 24. The brackets, 25 and 26, are preferably secured to the tipping member, 22, so that the shafts, 27 and 28, are near a horizontal line drawn parallel to the shafts through the center of gravity of each of the receptacles, when filled with liquid and the proportions of the tipping member may be such that the quantity of liquid in either receptacle of the tipping member, when in its upright position as at A, Fig. 1, is so distributed that the tipping member is overbalanced and tends to tilt in a clockwise direction until a bumper, 29, strikes a stop, 30, and the other receptacle, B, of the tipping member is at the same time brought to its upright position. The tipping member is held in each position by catches engaged by latches. This is shown more clearly with receptacle, A, Fig. 1, which is held in its upright position by means of a catch, 31, secured to the tipping member engaged by a latch, 32, which is rotatably mounted on a pin, 33, supported by any approved means as a bracket, 54, Fig. 3, fastened to the shell, 1. A float, 35, shown more clearly in Fig. 1, on a float rod, 38, which is slidingly received by guides, 36 and 37, is free to move in a vertical line in the circular casing, 34, of the head, 39. A set collar, 58, secured to the rod, 38, holds the float, 35, from dropping lower than may be desired. The upper end of the float rod, 38, has a boss, 59, adapted to lift the bell crank arm, 40, as the float, 35, rises which moves the latch, 32, Fig. 1, in a clockwise direction disengaging the catch 31, and allowing the tipping member 22, to tilt also in a clockwise direction as above described. The liquid in the receptacle, A, of the tipping member, 22, is then suddenly spilled from the end, 47, of the tipping member through the passage, 41, into measuring compartment, 3, below. A chute, 42, extends through the central portion of the tipping member, 22, and is adapted to receive the main portion of the liquid from above and deliver it to the compartments below. The discharge end, 43, of this chute swings over the spill-over, 44, as the tipping member tilts; when the receptacle, A, of the tipping member is upright, the chute delivers liquid through the opening, 55, to compartment, 3; and when the tipping member tilts bringing the receptacle, B, to its upright position the chute delivers liquid through the opening, 67, to compartment, 2, on the opposite side of the partition, 56.

Within the chute, 42, are pockets, 45 and 46, which are adapted to receive a portion of the liquid from above and deliver it to the receptacles of the tipping member. Pocket, 46, is adapted to deliver liquid through opening, 47, to the receptacle, A, when the receptacle, A, is in its upright position, while pocket, 45, is similarly adapted to fill the receptacle B, when in its upright position, through the opening, 70, Fig. 5. Any excess of liquid delivered to either receptacle of the tipping member passes out of the end of the tipping member to the corresponding compartment below. When receptacle, A, is in its upright position any excess of liquid passes through the opening 69, to passage 41, and thence to compartment, 3, below. A cross-brace, 48, Figs. 1 and 3, may support the inlet flange, 49, and a receiving chamber, 50, also shown in Figs. 2 and 4, beneath the inlet flange, 49, may be constructed so as to divide the entering stream of liquid and deliver a smaller portion of the liquid through the opening, 51, Figs. 3, 4 and 5, to either of the pockets, 45, or 46, Figs. 4 and 5, as the case may be, while the greater portion of the entering liquid passes through the larger openings shown at, 52, Figs. 3 and 4 and at 60, Fig. 3, at either side of opening, 51. The main portion of the liquid passes through openings, 52 and 60, through the chute, 42, and is delivered through the chute to the corresponding compartment below.

When a small volume of liquid is supplied to the chamber, 50, there might be a tendency for this small stream to pass to one side or end of the chamber, 50, especially if the bottom of this chamber were slightly inclined and thus liquid might under these conditions pass to one side of the pockets, 45 or 46, and not fill the receptacle of the tipping member below. Vertically extending ridges, 53 and 61, may be provided around openings, 52 and 60 respectively, but not around opening, 51, so that any small stream will be held from passing to openings, 52 and 60, and will pass through opening, 51, to the pockets and receptacles below. When a larger volume is supplied, liquid simply overflows the ridges, 53 and 61, and the main portion then passes through openings, 52 and 60, to the chute, 42, as above described.

The operation of the device is as follows: Liquid enters the receiving chamber, 50, through the inlet flange, 49, from any suitable supply line. The stream is divided in chamber, 50, and a greater portion of the liquid passing through the openings, 52 and 60, passes through the chute, 42, directly to measuring compartment, 3, below, while a portion of the liquid passes through the opening, 51, to the pocket, 46, whence it passes through opening, 47, to the receptacle, A, of the tipping member, 22. The proportions of these openings are such that the receptacle, A, becomes full of liquid before compartment, 3, is filled. When compartment, 3, has become filled to a level just below the line Y—Y, Fig. 2, (at which level liquid could spill through the siphon pipe) and preferably above the level, Z—Z, at the bottom of the head, the float, 35, rises; the boss, 59, at the top of the float rod, 38, lifts the bell crank arm, 40; the latch, 32, disengages the catch, 31, releasing the tipping member which tilts in a clockwise direction. The liquid contained in receptacle, A, of the tipping member, 22, is thus suddenly spilled from opening, 69, into compartment, 3, which finishes filling the compartment and flushes and starts the siphon, 5, which discharges the unit charge. At the same time the end, 43, of chute, 42, swings past the spillover, 44, directing the stream of liquid to the opposite measuring compartment, 2, through the opening, 67. The other receptacle, B, of tipping member, 22, then receives the entering liquid, and is automatically released at the proper time to start the siphon, 4, which discharges another unit charge. This brings the tipping member with receptacle, A, again upright as shown in Fig. 1, thus completing the cycle of operation. A counter, 62, Fig. 3, mounted on the shell, 1, operated by a suitable arm, 63, engaging a pin, 64, secured to arm, 65, of the bracket, 25, may register the number of unit charges or the number of double unit charges delivered by the meter so as to obtain the amount of liquid which has been delivered.

The proportions of the various parts of the meter may be such that when liquid is passing in a small stream to the meter and the tipping member tilts, liquid will rise to the level of the spill-over, 44, or possibly a few drops may pass to the opposite compartment, from which the unit charge should have been drained. When liquid is passing to the meter at a greater rate, say at the maximum rate which it is capable of handling, under which conditions liquid would tend to rise higher in the measuring compartments, liquid cannot rise higher but any excess of liquid will pass over the spill-over, 44, thus leaving practically the same quantity of liquid as when liquid is flowing at a lesser rate. This peculiar arrangement of the spill-over insures extreme accuracy in the unit charges and therefore in the amount or liquid delivered from the meter.

It is evident that wide variations in the proportions and arrangements of the various parts may be made within the scope of my invention and I do not confine myself to the particular constructions set forth.

What I claim as my invention and desire to protect by Letters Patent is:

1. A meter comprising a shell, means dividing the shell into two measuring compartments, means for supplying liquid thereto and means for discharging liquid therefrom, each compartment being adapted to spill liquid into the opposite compartment when liquid reaches a pre-determined level, such spilled liquid to become a part of the liquid next measured in said opposite compartment.

2. A meter comprising a shell, dividing means separating the shell into two measuring compartments, means for supplying liquid to the compartments and means for discharging liquid from the compartments, each compartment being adapted to spill liquid over the dividing means into the opposite compartment when the liquid reaches a pre-determined level, such spilled liquid to become a part of the liquid next measured in said opposite compartment.

3. A meter comprising a shell having a measuring compartment, a siphon for discharging liquid from the compartment, tipping means for directing liquid to the measuring compartment, means for supplying liquid to the tipping means, means normally holding the tipping means from tilting and means actuated by the liquid upon reaching a predetermined level in the compartment for releasing the holding means.

4. In a meter having a measuring compartment, means for discharging liquid from the compartment, storing means adapted to store a portion of the liquid above the compartment and to spill liquid into the compartment, means for supplying liquid to the storing means, means normally holding the storing means from acting and means actuated by the liquid upon reaching a predetermined level within the compartment for releasing the storing means at the proper time to start the operation of the discharging means.

5. A meter comprising a shell divided into measuring compartments, means for discharging liquid from the compartments, a tipping member above the compartments, means for supplying liquid to the tipping member, such tipping member being adapted to store a portion of the liquid supplied, means normally holding the tipping member from tilting and means actuated by the liquid upon reaching a predetermined level in the compartment for releasing the holding means at the proper time to start the discharging means.

6. In a meter, a receiving chamber for entering liquid, such chamber being provided with a plurality of openings leading therefrom and means preventing the delivery of liquid from one or more openings until liquid is being delivered from the remaining openings.

7. In a meter having a measuring compartment, a tipping member above the compartment for delivering liquid thereto, such tipping member comprising receptacles adapted to receive liquid and a single chute passing through the tipping member for delivering liquid therethrough.

8. In a meter having a measuring compartment, a tipping member above the compartment for delivering liquid thereto, such tipping member comprising receptacles placed side by side and adapted to tilt about an axis passing through each of the receptacles.

9. In a liquid meter having a measuring compartment, a member comprising a single chute for delivering liquid to the measuring compartment and receptacles adapted to receive a portion of the entering liquid.

10. In a liquid meter having a measuring compartment, a member comprising receptacles, a single chute for delivering liquid to the measuring compartment, and pockets in said chute for delivering liquid to the receptacles.

11. In a liquid meter having a measuring compartment, a head closing the top of the measuring compartment, means forming openings in the head, such head being adapted to displace liquid to prevent liquid from rising above the bottom of the head except in such openings.

12. In a liquid meter having a measuring compartment, a siphon for discharging liquid therefrom, such siphon having a bend, a head adapted to close the top of the measuring compartment, such head being adapted to displace liquid and extending from a level below said bend to a level above said bend.

13. A meter comprising a shell, means dividing the shell into measuring compartments, means for supplying liquid thereto, siphons for discharging liquid therefrom, each compartment being adapted to deliver liquid into another compartment when the liquid reaches a predetermined level, such delivered liquid to become a part of the liquid measured in said other compartment, means forming a liquid seal in each of said siphons, said liquid seal comprising means adapted to seal the said siphons while the same are operating, and to destroy the seal when said siphons are not operating.

14. A meter comprising a shell having a measuring compartment, a siphon for discharging liquid from the compartment, tipping means for directing liquid to the measuring compartment, means for supplying liquid to the tipping means, means normally holding the tipping means from tilting, means actuated by the liquid upon reaching a pre-determined level in the compartment for releasing the holding means, means forming a temporary liquid seal in said siphon, said liquid seal comprising means adapted to seal the said siphon while the same is operating, and to destroy the seal when said siphon is not operating.

15. In a meter having a measuring compartment, a siphon for discharging liquid from the compartment, such siphon being provided with means forming a liquid seal while the siphon is operating and with means for destroying the liquid seal when the siphon is not operating, said last referred to means being adapted to drain the liquid from said liquid sealing means, means for storing liquid above the compartment and adapted to deliver liquid to the compartment, means for supplying liquid to the storing means, means for supplying liquid to the compartment, means normally preventing the storing means from acting and means actuated by the level of liquid within the compartment for causing the storing means to deliver liquid to the compartment for the purpose of flushing the siphon.

HARLEY C. ALGER.

Witnesses:
VIVA LEE MOREN,
R. B. MCCAULEY.

Copies of this patent may be obtained for five cents each, by addressing the "Commissioner of Patents, Washington, D. C."